United States Patent

Garrett

Patent Number: 5,686,988
Date of Patent: Nov. 11, 1997

[54] GAS CONCENTRATION MEASUREMENT INSTRUMENT BASED ON THE EFFECTS OF A WAVE-MIXING INTERFERENCE ON STIMULATED EMISSIONS

[75] Inventor: W. Ray Garrett, Oak Ridge, Tenn.

[73] Assignee: Lockheed Martin Energy Systems, Inc., Oak Ridge, Tenn.

[21] Appl. No.: 668,509

[22] Filed: Jul. 2, 1996

Related U.S. Application Data

[63] Continuation of Ser. No. 268,081, Jun. 28, 1994, abandoned.

[51] Int. Cl.$^6$ .............. G01J 3/30; G01J 3/42; G01J 1/58
[52] U.S. Cl. .............. 356/318; 356/301; 356/319; 356/73; 250/458.1
[58] Field of Search .............. 356/300, 301, 356/317, 318, 319, 73; 250/458.1

[56] References Cited

U.S. PATENT DOCUMENTS

| | | | |
|---|---|---|---|
| 3,918,812 | 11/1975 | Holm | 356/73 |
| 3,920,334 | 11/1975 | Steicheu et al. | 356/317 |
| 3,954,336 | 5/1976 | Baird et al. | 356/73 |
| 4,284,354 | 8/1981 | Liao | 356/318 |
| 4,407,964 | 10/1983 | Elings et al. | 356/318 |
| 4,440,497 | 4/1984 | Carey et al. | 356/318 |
| 4,531,834 | 7/1985 | Nogami | 356/318 |
| 4,838,688 | 6/1989 | Rhoads | 356/318 |
| 4,867,559 | 9/1989 | Bach | 356/318 |
| 5,034,613 | 7/1991 | Deuk et al. | 356/318 |

OTHER PUBLICATIONS

Garrett et al, "Large Multiple Collective Line Shifts Observed in Three-Photon Excitations of Xe", *Physical Review Letters*, 9 Apr. 1990, vol. 64, No. 15, pp. 1717-1720.
Garret, W.R., "Forward Gain Suppression of Optically Pumped Stimulated Emissions Due to Self-Induced Wave-Mixing Interference during a Pump Pulse", *Physical Review Letters*, 28 Jun. 1993, vol. 70, No. 26, pp. 4059-4062.

*Primary Examiner*—Frank G. Font
*Assistant Examiner*—Jason D. Vierra Eisenberg
*Attorney, Agent, or Firm*—Shelley L. Stafford

[57] ABSTRACT

A method and apparatus for measuring partial pressures of gaseous components within a mixture. The apparatus comprises generally at least one tunable laser source, a beam splitter, mirrors, optical filter, an optical spectrometer, and a data recorder. Measured in the forward direction along the path of the laser, the intensity of the emission spectra of the gaseous component, at wavelengths characteristic of the gas component being measured, are suppressed. Measured in the backward direction, the peak intensities characteristic of a given gaseous component will be wavelength shifted. These effects on peak intensity wavelengths are linearly dependent on the partial pressure of the compound being measured, but independent of the partial pressures of other gases which are present within the sample. The method and apparatus allow for efficient measurement of gaseous components.

11 Claims, 9 Drawing Sheets

Fig. 6 key:
1 = resonance absorption
1A = nonresonance absorption
2 = resonance emission
2A = nonresonance emission
3 = resonance fluorescence ⎫
3A = nonresonance fluorescence ⎬ luminescence
4 = phosphorescence ⎭
△ = any transition mechanism other than radiative Energy transfer is governed by Plank's equation:
$\triangle E = hc/\lambda = h\nu$, wherein  E = energy
h = Plank's constant
c = speed of light
$\lambda$ = wavelength
$\nu$ = Frequency of radiation

Fig. 7

GAS CONCENTRATION MEASUREMENT INSTRUMENT BASED ON THE EFFECTS OF A WAVE-MIXING INTERFERENCE ON STIMULATED EMISSIONS

This application is a continuation, of application Ser. No. 08/268,081, filed Jun. 28, 1994, now abandoned.

The United States Government has rights in this invention pursuant to Contract No. DE-AC05-84OR21400 between the U.S. Department of Energy and Martin Marietta Energy Systems, Inc.

BACKGROUND OF THE INVENTION

1. Field of the Invention

The present invention relates, in general, to real time measurement of the concentration of a component of a gaseous mixture through the use of an optical spectrometer system. More specifically, concentration measurements may be obtained through utilization of a newly-discovered optical interference effect which produces dramatic changes in certain emission spectral lines, the changes being dependent upon the concentration of the analyte gas, but independent of other entities which may be present.

2. Description of Related Art

A wide variety of techniques for determining the presence or concentration of elemental or molecular constituents within a mixed sample using spectrometric measurements have been utilized. Spectrometric measurements entail the monitoring of electromagnetic radiation (EMR) as it is caused to emanate from, or interact with, the sample of interest.

The interaction of an analyte with electromagnetic radiation is based on changes in the level of some characteristic energy state of the analyte, for example, the oscillatory motion of a chemical bond, or the orbital location of a valence electron, or the rotational motion of the magnetic vector of an atomic nucleus. All of these types of characteristic states are quantitized in energy by the principles of quantum mechanics. The change in energetic state of an analyte can be caused by the absorption or emission of energy of an amount exactly equal to the difference in energies of the two states.

Electromagnetic radiation is that manifestation of energy, which is described by Planck's equation, $E=hc/\lambda=h\nu$, where E is the energy, h is Planck's constant, c is the speed of light, $\lambda$ is the wavelength, and $\nu$ is the frequency of radiation. Energy is thus characterized by discrete wavelengths or frequencies, and the range of all wavelengths is called the electromagnetic spectrum.

Figure 7:
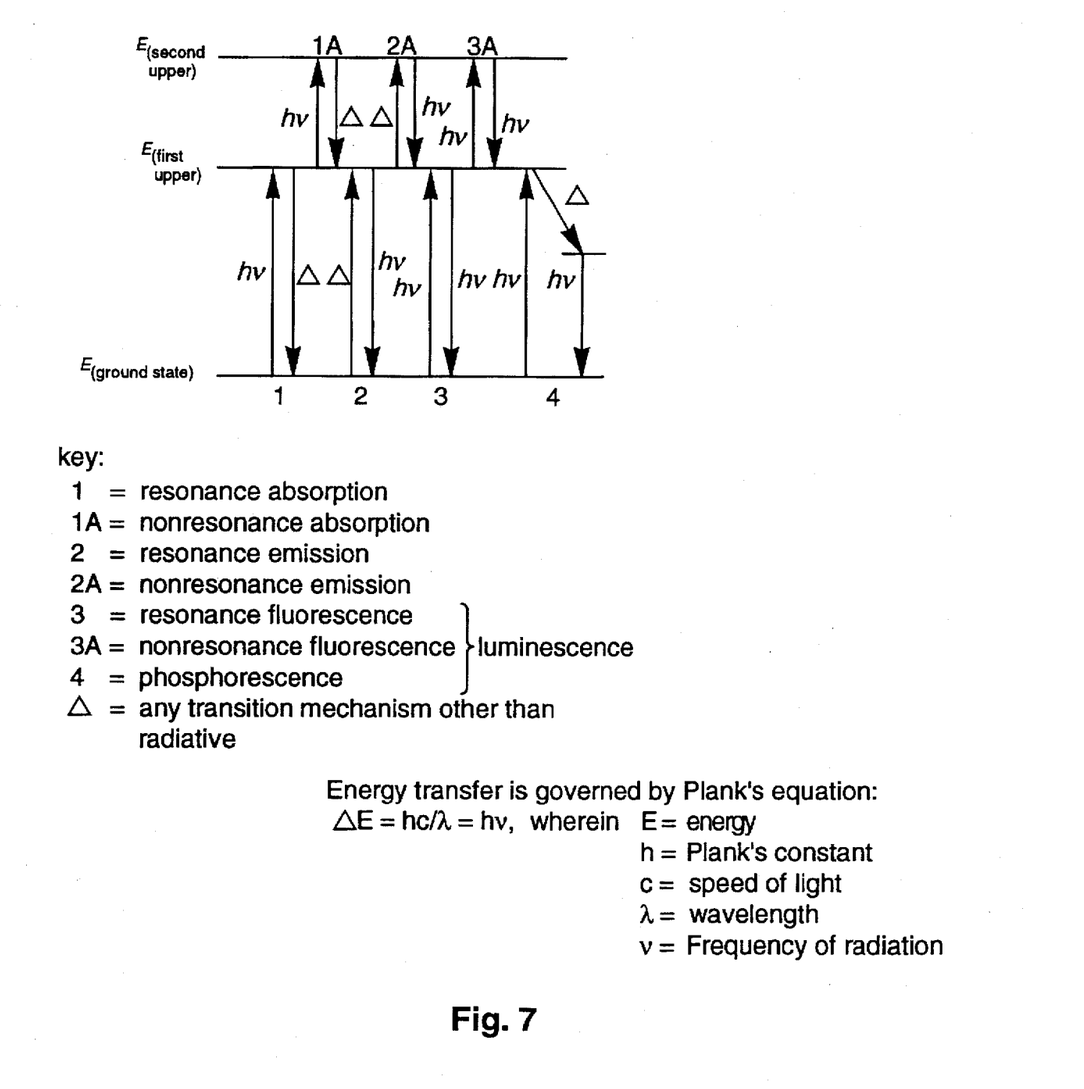
FIG. 7 (FIG. 7) is a prior art graphic representation of different types of electromagnetic spectral interactions (from McGraw-Hill Encyclopedia of Chemistry, Parker, ed., 1983, pp. 973–986, said reference is hereby incorporated by reference).

Therefore, a spectrometric measurement is the result of the interaction of a particular wavelength and quantity of radiation with some characteristic energy state of an analyte so as to cause the energy state of the analyte to change. There are different types of spectral interaction, or radiative transitions, which can occur, depending upon the condition of the characteristic energy state involved. Absorption occurs when a system gains energy through the retention of the energy associated with electromagnetic radiation incident on the system. Emission is the opposite of absorption; a system loses energy, and the energy loss is manifested as electromagnetic radiation. Fluorescence is a process in which energy gained radiatively is immediately lost by a system, also radiatively (See also, FIG. 7). In addition to monitoring transitions between energy states, it is possible to monitor the manner in which the polarization of the radiation changes as it is absorbed (circular dichroism) or emitted (optical rotary dispersion). As a consequence, there are many different techniques of spectrometric measurement. They differ depending upon what type of radiation is monitored, what type of transition is involved, and whether some characteristic of the radiation is also observed.

Analytical determinations of the presence of a constituent (qualitative determination) result from sensing the energetic transition as it occurs. Each particular element or molecule will possess its own energetic characteristics, so that monitoring a specific transition will identify a constituent, exactly analogous to identifying people through the use of fingerprints. The determination of the concentration of a constituent (quantitative determination) is a result of the direct relationship between the amount of radiation which is emitted or absorbed and the amount of the element or molecule present.

Spectrometers, in general, require a source of radiation, a dispersion device, and a detector. For emission spectra, the source may be taken as the sample to be measured itself, although another source of radiation may be needed to excite the sample to an excited state. The type of equipment used to perform spectrometric analysis will vary widely according to the materials being tested and the portion of the electromagnetic spectrum within which the testing is to occur. For example, within the visible spectra (i.e., electromagnetic energy having a wavelength of approximately 400–800 nm), wherein excitations of valence elections may be studied, typical energy sources include Tungsten lamps and typical detectors include phototubes.

Lasers have become an especially useful source of electromagnetic radiation, and have opened new areas of spectroscopy, not only because of the intensity of the radiation supplied to the sample, which permits absorption of several photons in a single process, but also because of the coherent properties of the radiation, which permit the study of events occurring on a picosecond time scale, and because of the sharply defined frequency of the laser radiation, which provides photons of precisely the required wavelength required to excite one of the resonant transitions in a particular analyte species. These characteristics of tunable laser radiation provide the capability to excite a significant fraction of individual analyte species that are located within the path of the excitation laser beam. Since the excitation rate can be much larger than the spontaneous fluorescence decay rate, a group of excited atoms or molecules, all in the same excited quantum state, can be produced along the path traversed by the laser photons. Under these conditions, spontaneous emissions at one or more of the characteristic frequencies of the analyte can lead to stimulated emission whereby a fluorescent photon from one emitter stimulates an emission, at the same frequency, from another excited species further along in the excitation volume. This process is called amplified spontaneous emission (ASE), or, under laser excitation, the more specific designation of optically pumped stimulated emission (OPSE) is utilized. OPSE is used in the present invention.

There are two kinds of dispersive elements, prisms and diffraction elements. The earlier and more commonly available prism has been supplanted in many cases by diffraction elements.

Using these basic elements, a wide variety of spectroscopic techniques have been developed. For example, in atomic absorption and fluorescence spectroscopy, the line spectra from atomized samples or selected elements may be measured at levels of concentration down to parts per million, on the average. However, detection limits vary greatly from element to element. In contrast, Raman spectroscopy utilizes the fact that when electromagnetic energy passes through a sample, a fraction of the energy, e.g., light, is scattered by the molecules, and so exits the sample at a different angle. Some of the scattered light will have a wavelength different from that of the original electromagnetic energy; this is referred to as Raman scattering and alters the normal characteristic spectrographic "line" for the light (e.g., by generating a Stokes line). This scattering can lead to "pulse widening" on the spectrograph which can be used to indicate the presence of a particular component.

Under many practical circumstances, however, previously developed spectroscopy methods have failed to provide adequately accurate and sensitive methods for real time measurement of the concentration, or partial pressures, of a given component of a gaseous mixture in a remote, automated, continuous monitoring mode of operation. The present inventive apparatus and method solve these problems and suboptimizations by utilizing a newly-discovered optical effect which produces dramatic changes in selected spectral emission lines. For selected transitions (roughly half of those produced from ground state excitation), a quantum interference can be produced by the OPSE process to produce large spectral changes in stimulated emissions produced with maximum intensities collinear with the laser beam (or beams). The extent of these spectral changes are linearly dependent on the partial pressure of the chemical compound being measured, but independent of the partial pressures of other gases or vapors which may be simultaneously present; and independent of the intensity of the excitation laser sources or of the intensity of the emitted light. This new effect thus allows a concentration measurement to be made in two modes-one applicable at low concentration (the lower limit being dependent on the properties of a particular analyte) and a second mode applicable at higher concentration, with upper limits corresponding to partial pressures greater than 1000 Torr (mmHg).

SUMMARY OF THE INVENTION

The apparatus and method of the present invention utilize a newly-discovered optical interference effect to provide real-time measurement of the concentration of a gaseous component within a gaseous mixture. By radiating a sample with a laser beam at a one-photon or two-photon resonant transition frequency of the analyte and at a sufficient intensity to cause stimulated emissions to occur during the time integral of the laser pulse (i.e., while the laser is still irradiating the sample) it is possible to create a quantum interference in the subset of optically pumped stimulated emissions (OPSE) that involve an odd number of photons and terminate on a state that can emit back to the initial state of the analyte. It is believed that the interference results from a four-wave-mixing field that is created by non-linear frequency mixing of the laser and OPSE photons within the analyte sample, being measured to cause an intensity suppression (when measuring forwardly along the path of the laser) or a shift in peak intensity wavelength (when measuring rearwardly along the path of the laser).

The invention method is much more sensitive than that previously-used line broadening methods (which are very susceptible to interference by other components within the sample), and more accurate and more sensitive than absorption or fluorescence methods, which are believed to be the only available alternate methods to perform continuous, on-line, non-intrusive monitoring of the partial pressure of a gaseous or vapor component. The inventive method may also be used to monitor the content of, for example, smokestack emissions which are open to the air.

The inventive apparatus comprises generally: one or two tunable laser sources; a beamsplitter; mirrors; optical filters; optical spectrometer; and data recorder. A tunable laser beam is used to excite a resonant quantum transition in the molecules of the gaseous component, the concentration of which component is being measured within the gaseous mixture. A beamsplitter and dichroic mirror-filter combination directs the OPSE emanating from the sample forward and backward along the path of the laser beam into a spectrometer of sufficient resolution to resolve rotational spectral features.

The concentration of a particular gas within a mixture may be revealed by examining the resolved stimulated emission lines. For example, the absorption and emission of light by atoms and molecules is governed by number of factors that play critical roles in the absorption and emission processes. Some governing factors, such as oscillator strengths and quantum selection rules are internal to a molecular system whereas others such as temperature, number density, external electric or magnetic fields, etc., are external influences on absorption and emission of photons. The inventor has discovered that a broad class of stimulated emissions, referred to here as optically pumped stimulated emissions (OPSE), are strongly influenced by a new interference effect, and that the effect makes possible a new way to accurately determine the number density of a selected molecular species within a mixed gas-phase sample.

In general terms, measurements of the class of OPSE in this invention involve the interactions of an odd number of photons (i.e., an odd number of photon-sized steps in the energy state of a component) to mediate the observed emission process. The stimulated emission spectra are observed along the direction parallel and antiparallel to the laser beam (or beams). For a broad subset of OPSE (about one half of all emission) an interference process occurs during the laser pulse whereby the interference is produced by a four-wave mixing field which, it is believed, is unavoidably generated within the gas sample. As a result of the inference, the particular subset of the emissions forward direction (parallel to the laser beam) undergo a pressure dependent suppression of intensity, and the same subset emitted in the backward direction (antiparallel to the laser beam) undergo a pressure dependent shift in wavelength. This subset of emissions is defined by the set of transitions involving a change in angular momentum of quantum number J of zero or one unit ($\Delta J=0, \pm 1$) from that of the initial state. Other stimulated transitions, also emitted simultaneously, having a $\Delta J=\pm 2, \pm 3$ are unaffected by the inherent interference and thus show no pressure dependent suppression or shifting. Thus a measurement of one emission line showing a pressure dependent suppression (forward) or shift (backward) and one adjacent line showing no suppression or shift (a $\Delta J=\pm 3$ line—i.e., emission spectra will appear at characteristic wavelength) can be used to directly determine the number density (or partial pressure) of the gas undergoing excitation and emission. The forward intensity is inversely proportional to partial pressure and the shift in frequency of the backward emission is directly proportional to concentration over a wide range of pressures. The relative strengths (in the forward emissions case) or relative wavelengths (in the backward emission case) of one line of each type can be determined with a grating spectrometer, or in a simpler method, by a simple etalon-reticon combination. Furthermore, this measurement may be made without external calibration of the spectrometer.

The measurement method proceeds in one of two different modes: one mode being applicable for measurements at low concentrations, the other mode being applicable for measurements at higher concentrations. At low concentration (from a very small fraction of a Torr to a few Torr of partial pressure of the analyte) the stimulated emissions that propagate in the forward direction (parallel to the laser beam(s)) undergo a concentration dependent suppression of intensity. Due to this suppression the forward intensity is inversely proportional to the partial pressure of the analyte (the emitting species) while the intensity of the stimulated emission from the same transition that propagates in the backward (anti-parallel) direction retain their normal intensity. The pressure dependent suppression of the forward emission is due to the discovered nonlinear wave-mixing interference, not absorption, thus it is possible for forward and backward emissions to behave differently. Since the intensities of the subset of forward stimulated emissions are inversely proportional to concentration of the analyte, at some upper concentration limit (the value depending on the particular analyte) these emissions become too weak to be measured during the laser pulse. But the backward directed OPSE has normal intensity at all concentrations. However, the anti-parallel OPSE is influenced by the second effect of the interference—namely, these stimulated emissions that occur during the laser pulse are shifted in wavelength by a concentration dependent interference-based shift. The wavelength shift is linear in concentration of the analyte. Thus at very low concentrations (where mode I applies) the shift in wavelength will be too small to be observed, but at higher concentrations these shifts are easily discerned and this second mode becomes applicable. The shift in the OPSE wavelengths are directly proportional to analyte concentration. Moreover, since optical transitions proceed very rapidly when undergoing stimulated emission, most of the photons in the selected transitions are produced during the time interval of nanosecond or longer laser pulses. Any emissions that occur after the laser pulse has passed through the sample will not be suppressed or shifted in wavelength. Such emissions, that emanate from atoms or molecules that are left in an excited state after the laser pulse has passed, will appear as normal fluorescence, separated in time or in time and wavelength from the stimulated emissions observed during the laser pulse. One other feature of the interference-induced concentration-dependent shift phenomenon is utilized in the present context. A reflecting mirror can be placed in the laser beam after it passes through the analyte, causing the beam to propagate back along the same path in the opposite direction, thereby exposing the analyte atoms or molecules to identical beams propagating in opposite directions. Then two-photon excitation can be produced in a second manner, namely, by absorption of one photon traveling in one direction and a second photon traveling in the opposite direction. Due to the nature of the wave-mixing phenomenon, an atom or molecule that is excited in this fashion undergoes stimulated emission with no discernable concentration dependent interference-induced shift. Thus when practical considerations allow for creation of this beam geometry, a transition can be stimulated to emit at two-different wavelengths simultaneously. Then as a spectrometer is scanned to record a chosen emission peak two peaks will be recorded, one peak (the shifted peak) being produced by stimulated emission resulting from absorption of two-photons traveling in the same direction, and the second peak (unshifted) being produced by stimulated emission resulting from absorption of one photon traveling in one direction and another in the opposite direction. The separation between the two emission peaks is directly proportional to concentration of the emitting species (analyte).

The present inventive apparatus and methodology thus allows direct concentration determinations to be made in the following manner. An appropriate laser source (intensity, wavelength and minimum pulse length) is chosen for exciting a resonant transition in an analyte, where such transition produces an excited state of the analyte from which fluorescent photons are emitted (thus the chosen state cannot be the lowest possible excited state of the analyte). The choice among the infinite number of possible energy levels and concomitant transitions that are possible in anatomic or molecular analyte is made under the restriction that the final state of the analyte that is reached by the excitation and subsequent process be one that is; (a) reached through the involvement of three photons and (b) the final state be one that has angular momentum quantum number that differs by zero or one unit from that of the ground state, condition (a) can be met through an excitation by absorption of two photons from the laser beam accompanied by one emission photon from the analyte to reach the final analyte state, or by absorption of one laser photon and step-wise emission of two photons from the analyte—i.e. emissions from each of two transitions leading downward in energy to the final analyte state. Condition (b) is easily met since about half of the final states accessible through laser excitation will satisfy the specified criterion. On occasion more optimum performance can be achieved through the use of two separate laser sources to produce two-photon excitation of a chosen analyte transition, whereby one photon from laser one an done photon from laser two are simultaneously absorbed from two beams that co-propagate and overlap in space and time within the beam path through the analyte. The details of the method are otherwise the same independent of whether two-photons from one laser or one photon from each of two lasers are utilized in the analyte excitation step. The choices under (a) and (b) can be extended to excitation-emission schemes involving higher odd-numbers of photons (5,7, etc.) and all considerations remain the same. This provides a generalization of the method that could be suitable for certain applications involving high energy analyte states.

Mode I: For low concentrations, above some very small minimum that is determined by the strength of an analyte transition and the bandwidth (energy spread) of the laser used for measurement, a concentration determination is made by measuring the intensity of a chosen stimulated emission in the forward and backward directions utilizing the same spectrometer, detector, recorder, etc. and comparing the relative intensities of forward versus backward emissions. The ratio of the forward to backward intensity is inversely proportional to the concentration of the analyte. The determination can be made independent of the absolute brightness of the emission, since the wave-mixing interference phenomenon fixes the ratio of the two components at a given concentration independent of intensity.

Mode II: For higher concentrations where the suppression of forward emissions in the required subset of OPSE is essentially complete, a second mode of measurement is invoked. The same considerations are given to laser and emission choices as described for mode I. However use is made of the shifting phenomenon for a concentration of determination. This constitutes a second (high concentration) mode of measurement, but with the same apparatus. When an analyte transition of choice produces only one convenient fluorescent emission line (usually the case with atomic species), then reflecting mirror is placed in the laser beam, thereby simultaneously producing stimulated emissions at two different wavelengths. With the spectrometer the two emission peaks are recorded. The concentration is directly proportional to the separation in wavelength between the two emission peaks that are produced by the one transition. The proportionality constant is easily determined by measurement of a known concentration of the analyte. The spectrometer does not require an absolute wavelength calibration, since only a measurement of the separation between two lines is required for a concentration determination.

BRIEF DESCRIPTION OF THE DRAWINGS

The preferred embodiments of the present invention may be better understood through reference to the drawing figures appended hereto, wherein like numerals refer to like elements throughout and wherein:

FIG. 3A and 3B (FIGS. 3A & 3B) are graphic representations of spectroscopic data of optically pumped stimulated emission (OPSE) profiles from resonant two-photon excitation of Na $4D_{3/2},5/2$ as depicted in the inset of FIG. 3B; FIG. 3A shows backward components; FIG. 3B shows forward $4D \rightarrow 3P_{1/2},3/2$ components; both FIGS. at $P_{Na}=1.8$ Torr; pump energy=5 mJ/pulse;

DETAILED DESCRIPTION OF THE PREFERRED EMBODIMENTS

The invention provides real time (on-line) measurement of the concentration, or partial pressure, of a given component of a gaseous mixture in a remote, continuous monitoring, automated mode of operation, as in monitoring a gas stream process input (or output). The method is hundreds of times more sensitive than line broadening methods and more accurate and more sensitive than absorption or fluorescence methods (which are currently the primary competitors for continuous on-line nonintrusive monitoring of the partial pressure of a gaseous or vapor component). The invention may provide, for example, on-line concentration monitoring of gas streams in chemical processes, gaseous mixture preparation (lamps, etc.), outgasing rate measurements, combustion analysis and control, vapor deposition analysis and control in thin film preparation, and others outside the range of presently available measurement techniques. The inventive apparatus is believed to be no more complicated or expensive than other competing methods.

The inventive apparatus comprises, generally, one or two tunable laser sources, beamsplitter, mirrors, optical filter, optical spectrometer, and data recorder for remote, on-line (continuous) measurement of total or partial pressure (concentration) of static or flowing samples of gases, vapors or mixtures. The invention is based on a newly discovered optical interference effect which produces dramatic changes in selected spectral stimulated emission lines where the changes are functionally dependent on the partial pressure of the chemical compound being measured, but independent of the partial pressures of other gases or vapors which may be simultaneously present (i.e., forward emission intensities are inversely proportional to concentration and shifts in backward emissions are directly proportional to concentration).

A tunable laser beam is most preferably used to excite a selected resonant quantum transition in the molecule whose concentration is being determined. Other sources of electromagnetic radiation might also be used in certain circumstances—the important criteria being, as will be discussed further hereinafter, that adequate energy be produced by the source and that the energy produced by the source be coherent. A beamsplitter and dichroic mirror-filter combination will preferably be used to direct optically pumped stimulated emissions (OPSE) emanating from the sample forward and backward along the path of the laser beam into a spectrometer of sufficient resolution to resolve rotational spectral features. The concentration of gas will be revealed in the behavior of the resolved stimulated emission lines.

The absorption and emission of light by atoms and molecules is governed by a number of factors that play critical roles in absorption and emission processes. Some governing factors, such as oscillator strengths and quantum selection rules are internal to a molecular system whereas others such as temperature, number density, external electric or magnetic fields, etc., are external influences on absorption and emission of photons. The invention utilizes the fact that a broad class of stimulated fluorescent emissions, referred to here as optically pumped stimulated emissions (OPSE), are strongly influenced by a new effect, and that the effect makes possible a new way to accurately determine the number density of a selected molecular species within a mixed gas-phase sample. In general terms, measurements of OPSE involving an odd (but not unitary) number of photons are conducted by observing along the direction parallel and antiparallel to the laser beam (or beams) used to mediate the emission process. An interference process occurs during the laser pulse whereby an interfering four-wave mixing field is unavoidably generated within the gas sample in association with a broad subset of the possible stimulated emissions in an analyte spectrum. As a result of this interference, the subset of the emissions in the forward direction which satisfy the requirements for producing the interference undergo a pressure dependent suppression (the intensity of the suppression is inversely proportional to concentration of the analyte), and the same subset emitted in the backward direction undergo a pressure dependent shift in wavelength where the shift in frequency is directly proportional to concentration. This subset is defined by the set of transitions involving a change in angular momentum quantum number J of zero or one unit ($\Delta J=0, \pm 1$) where the terminal state of the observed emission is reached through a three photon pumping. Other stimulated transitions, also emitted simultaneously, having a $\Delta J=\pm 2, \pm 3$ are unaffected by this inherent interference and thus show no pressure dependent suppression or shifting. Thus a measurement of one emission line showing a pressure dependent suppression (forward) or shift (backward) and one adjacent emission line showing no suppression or shift (a $\Delta J=\pm 3$ line) can be used to directly determine the number density (or partial pressure) of the gas undergoing excitation and emission. The effect is directly proportional to number density, or concentration, it is quantitatively predictable, or easily calibrated, accurate and applicable over a wide range of pressures. The relative strengths (in the forward emissions case) or relative wavelengths (in the backward emission case) of one line of each type can be determined with a grating spectrometer, or for some cases in a simpler method, by a simple etalon-reticon combination.

(a) Apparatus

Figure 1:
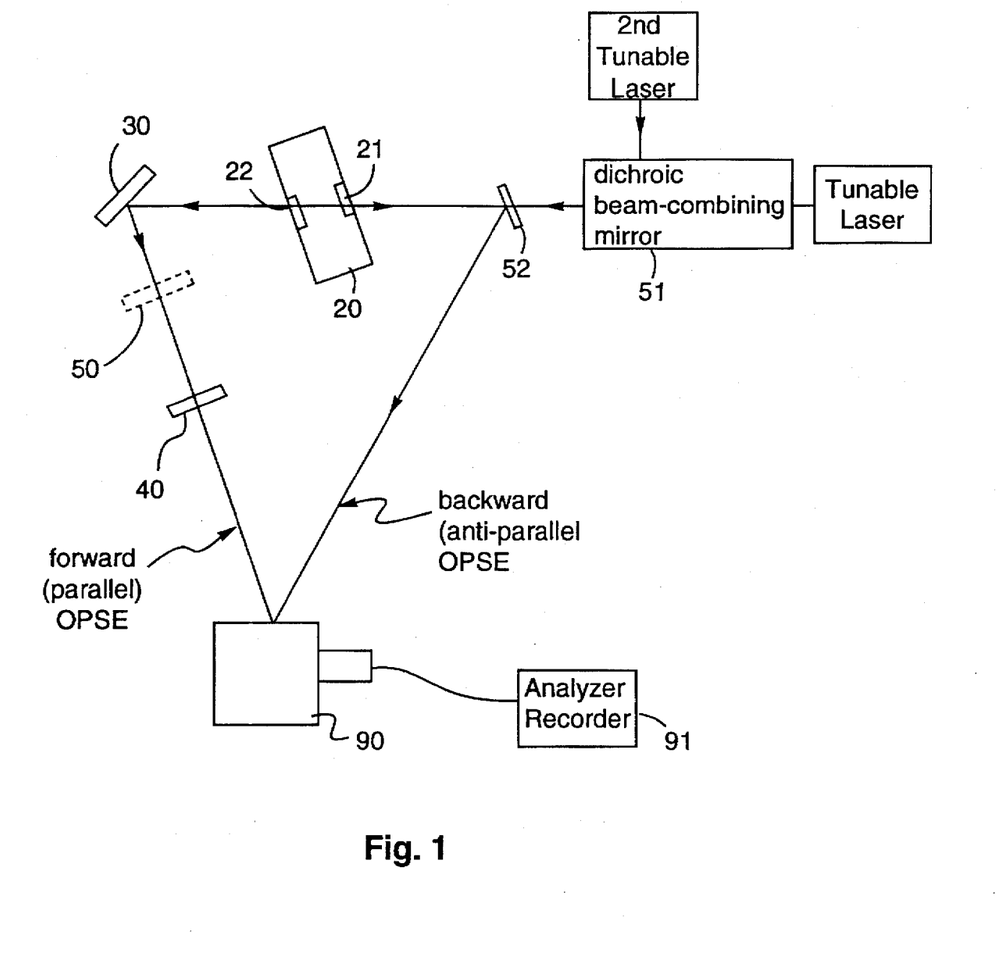
FIG. 1 (FIG. 1) is a schematic drawing of the inventive apparatus for measurement of a contained sample.
Figure 1A:
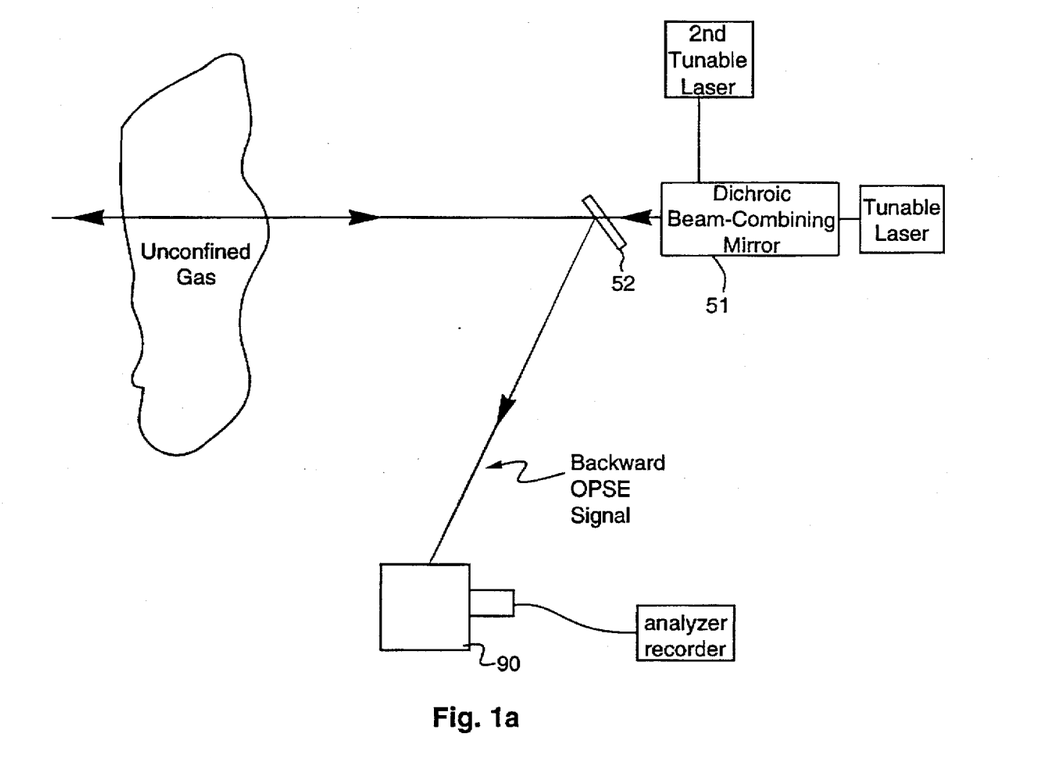
FIG. 1a (FIG. 1a) is a schematic drawing of the inventive apparatus for measurement of an unrestricted sample.

An example of the inventive apparatus is depicted in FIG. 1. A tunable laser beam is passed through entrance 21 and exit 22 ports of a pipe or vessel 20 containing a sample of a gas, of which the concentration of a certain component is to be determined. The laser frequency is tuned to produce resonant excitation by one-photon or two-photon absorption in the sample of the component being measured to an excited state from which characteristic emissions can occur as the excited analyte decays down to a lower lying quantum state (or states). The only requirement on the resonant excitation is that energy levels below the chosen excited state be available to provide fluorescent emissions involving a total of three photons (as clarified further in FIG. 7). That is, one photon absorbed followed by two step-wise emissions, or two laser photons absorbed followed by one photon emission. This flexibility can be helpful in achieving the required excitation. For example, at some wavelengths it may be difficult to find sources (e.g., lasers) capable of imparting the necessary energy in one photon. If two photon excitation is used, however, it may be possible to irradiate the sample at 50% of the resonant frequency and thereby impart the total required energy with available, and inexpensive, sources. Furthermore, when properly selected to correspond to the characteristic emission frequencies of the analyte, the use of two source/two photon radiation can also offer improved sensitivity. When multiple sources are used to irradiate the sample, however, it is essential that coherence (i.e., in-phase oscillation) of the sources be achieved. The coherence of the energy produced by lasers is an important reason why lasers comprise the most preferred source for use with the present invention.

The amount of energy required to produce the required emission spectra will depend upon the analyte material. In general, the energy required to excite such states is lower with metals, higher with molecular gases, and highest with noble gases and positive ions. Also, the source needs to continue to irradiate the sample with energy as the inventive process is in use—i.e., it is believed that photon$_2$ interacts with the OPSE emission of photon$_1$. The pulse length and spectral bandwidth of the laser also affects the sensitivity of the system. It is believed that, in very general terms (since, as noted above, sensitivity limits will be greatly affected by the type of material being tested), use of nanosecond ($10^{-9}$ sec) laser pulses will provide partial pressure measurements in the range of 0.01 Torr (and up) for atomic vapor analytes and in the range of 10 Torr (and upward) for molecular analyte. Long pulse length tunable lasers (possibly of special design) could improve the sensitivity by a factor of ten, thus increasing the useful range of the method.

A mirror 30 guides the forward emissions through a filter 40, which transmits the OPSE light but blocks the laser light, into a spectrometer 90. The spectrometer 90 is preferably scanned across at least two emission lines, one pressure dependent line associated with $\Delta J=0, \pm 1$, and one pressure independent line associated with $\Delta J=\pm 2, \pm 3$. For measurements at higher concentration, a beam splitter 52 is used to guide the backward propagating OPSE into the spectrometer 90 where the same two (or more) lines are recorded. The emission lines are suitably recorded by the spectrometer 90 or by an external chart recorder, storage scope, computer, or other appropriate device which can record an analog or appropriately digitized signal.

Figure 2:
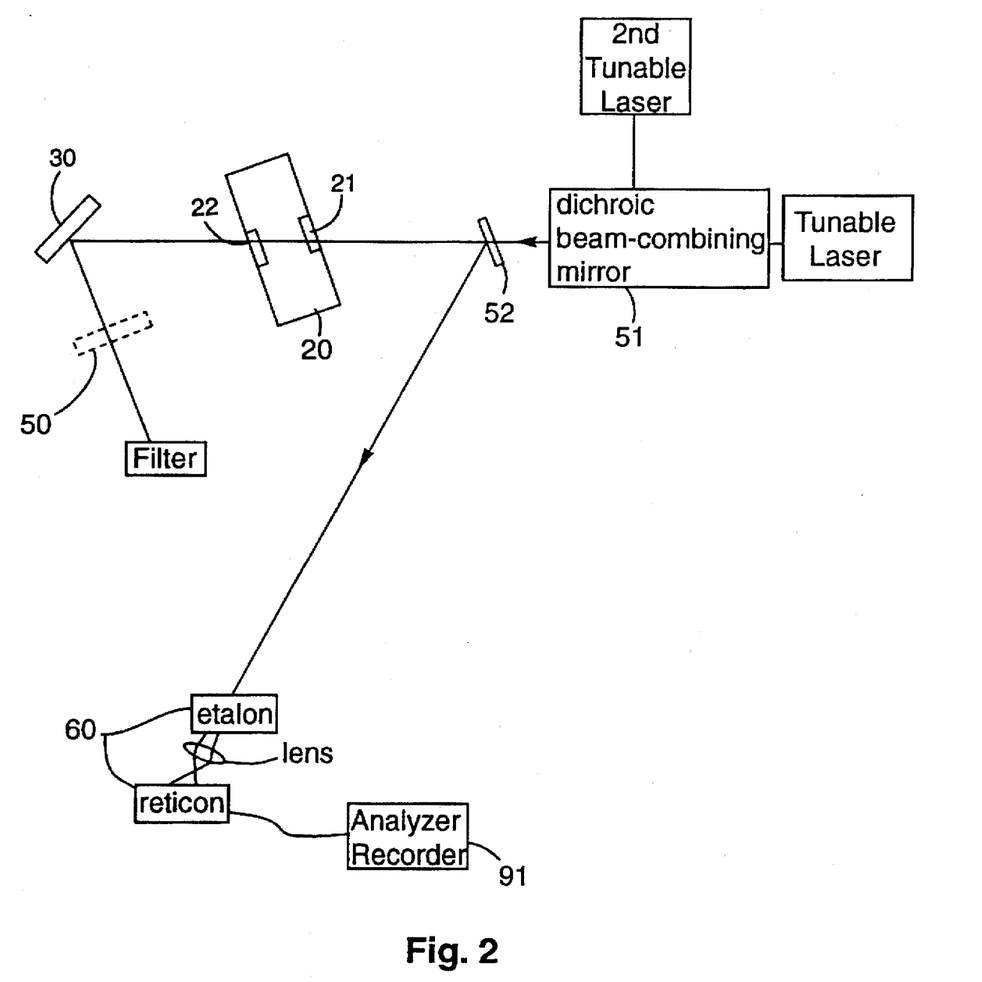
FIG. 2 (FIG. 2) is a schematic drawing of an alternate embodiment of the inventive apparatus.

Clearly, within these general parameters, e.g., need to have source capable of producing an odd, non-unitary, number of photons of coherent electromagnetic energy, etc., a wide variety of components may be utilized in the inventive apparatus depending upon the particular application desired (e.g., FIG. 2 shows an alternate embodiment of the invention wherein an etalon/reticon pair 60 is used in place of a spectrometer 90).

Alternate Embodiment I

For measurements in the higher concentration range, the chief embodiment of the invention rests with measurement of the OPSE wavelength shifts as opposed to measurement of reduced intensity forward emissions, which is the chief embodiment for lowest analyte concentration measurements. The measurement of a small shift in wavelength of a single individual emission line could be difficult since absolute calibration of spectral wavelength usually requires some external calibration of a spectrometer. Thus it is very significant that an analyte spectrum contains OPSE "lines" that are unaffected by the interference processes, interspersed with emission lines that do undergo the pressure dependent shift. Thus the magnitude of the shift (and thus the analyte concentration) can be determined by simply measuring the separation of a pair of such lines. Thus the spectrometer does not require an absolute calibration for such measurements.

In the case of emissions from atoms, as opposed to molecules, spectra do not exhibit a number of closely spaced lines with shifted and unshifted components interweaved as discussed above (occasionally, with atoms, there may be two or more spectral lines, but this is the exception). Thus, in these instances, this important feature is usually not present. However, there is an alternate embodiment of the present invention that restores this feature for the case of atomic analytes. This embodiment of the invention is also usable with analytes which are more complex than atoms, but it is especially useful with sensing atomic analytes. By inserting the removable mirror 50 indicated in FIGS. 1 and 2 into the laser beam, the single beam is caused to simultaneously traverse the sample in two counter propagating directions (i.e., mirror 50 will reflect the forward emission spectra backward through the sample and to the spectrometer 90). With this counter propagation geometry, yet an additional feature of the shifting phenomenon is utilized. When two photon excitation is produced by absorption of one photon traveling in one direction and another from the opposite direction (i.e., photons which were produced at slightly different times by the source), then a different interference induced shift is produced in OPSE produced by this mode of excitation, and it is much smaller (near zero) than the shift produced by emission following absorption of two photons traveling in the same direction. Thus in this embodiment, a single emission line is split into two separated lines with a separation that is again proportional to concentration. Thus a single emission line, of the subset that exhibits the interference and resultant shift, can be utilized to measure an analyte concentration by measurement of the separation between the two components provided in this embodiment. Thus, again, the measuring spectrometer need not be calibrated as to absolute wavelength. This will be a preferable embodiment of the invention for application to atomic vapor concentration measurements, whereas the embodiment without the retroreflection mirror 50 will be the chief alternative for measurements of molecular concentrations.

Alternate Embodiment II

Increased sensitivity in the two-photon pumping method may be achieved by utilizing two separate lasers each of a different color (wavelength), where the colors are chosen to provide intermediate state resonant enhancement while still maintaining two-photon resonance. As mentioned above, an etalon-reticon combination can be utilized instead of a recording spectrometer to provide very high resolution in an extremely simple detection-recording apparatus for any fixed-species application. Interchangeable etalons could be utilized to switch between measurements of different species. A representative configuration of this alternate embodiment is that of FIG. 2.

Figure 3A:
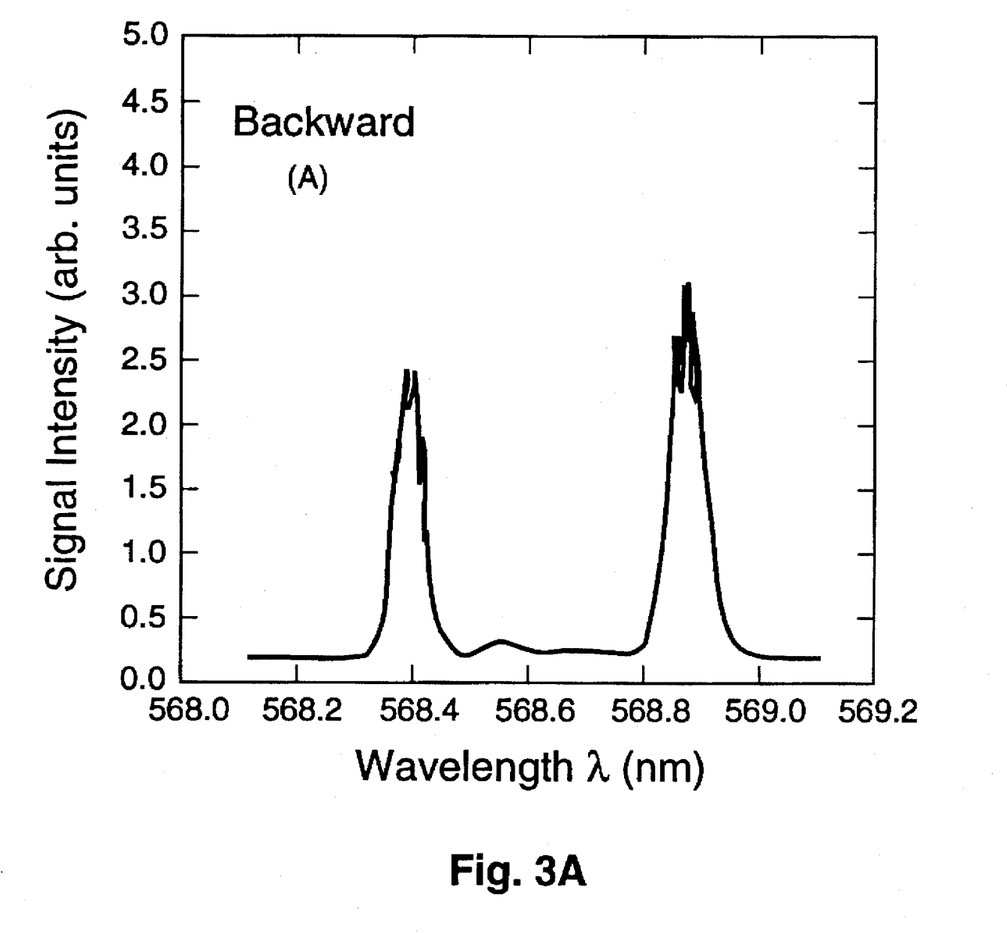
Figure 3B:
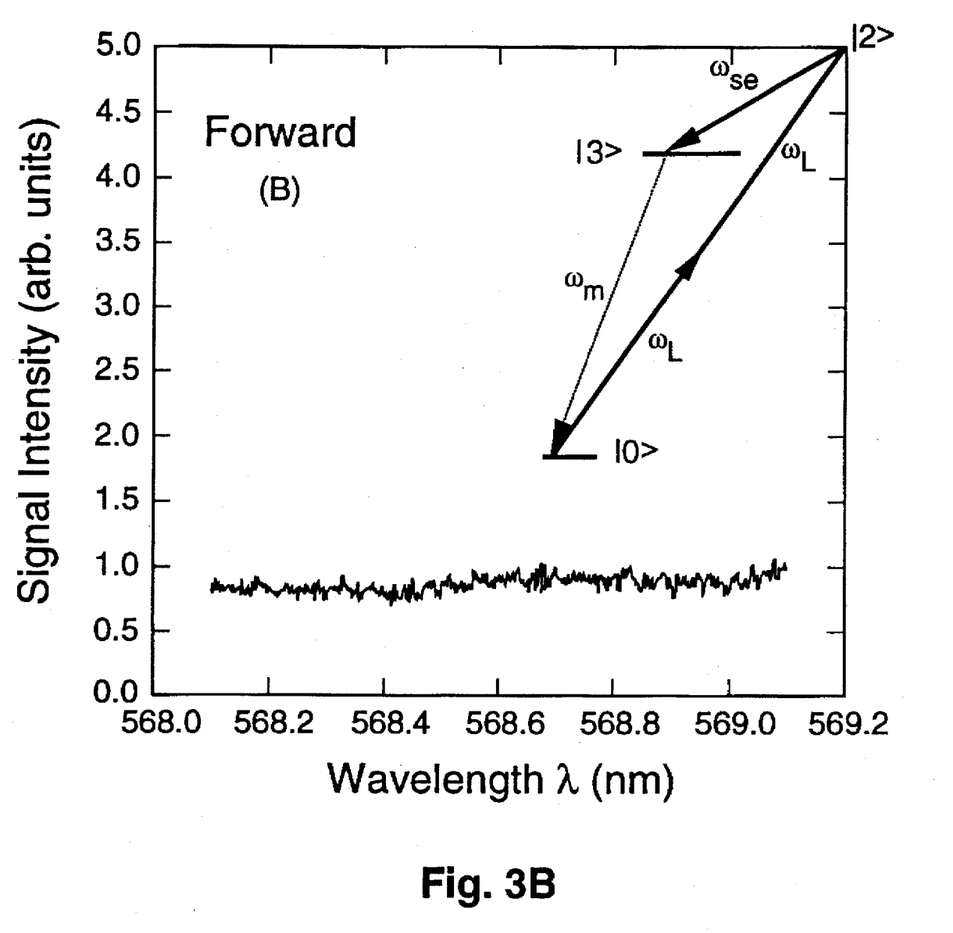

(b) Examples (i) In FIGS. 3A & 3B, traces of Na $4D_{3/2},5/2$ to $3P_{1/2}$ and $3P_{3/2}$ OPSE profiles at 568.4 and 569.0 nm are shown for forward (FIG. 3B) and backward (FIG. 3A) emissions. These data result from unfocused $\propto 4$ ns pulses of 5 mJ/pulse electromagnetic energy from a laser with 2 mm beam diameter and $\propto 0.1$ cm$^{-1}$ band width. In this "high" pressure case, the forward component is not visible above the noise (2× gain), but strong backward emissions are readily observed. The start-up time for OPSE under the present experimental conditions is much shorter than the laser pulse length; thus almost all of the observed emissions "occur during the laser pulse." Under these conditions, the forward component is strongly suppressed by the interference mechanism under discussion.

Figure 4:
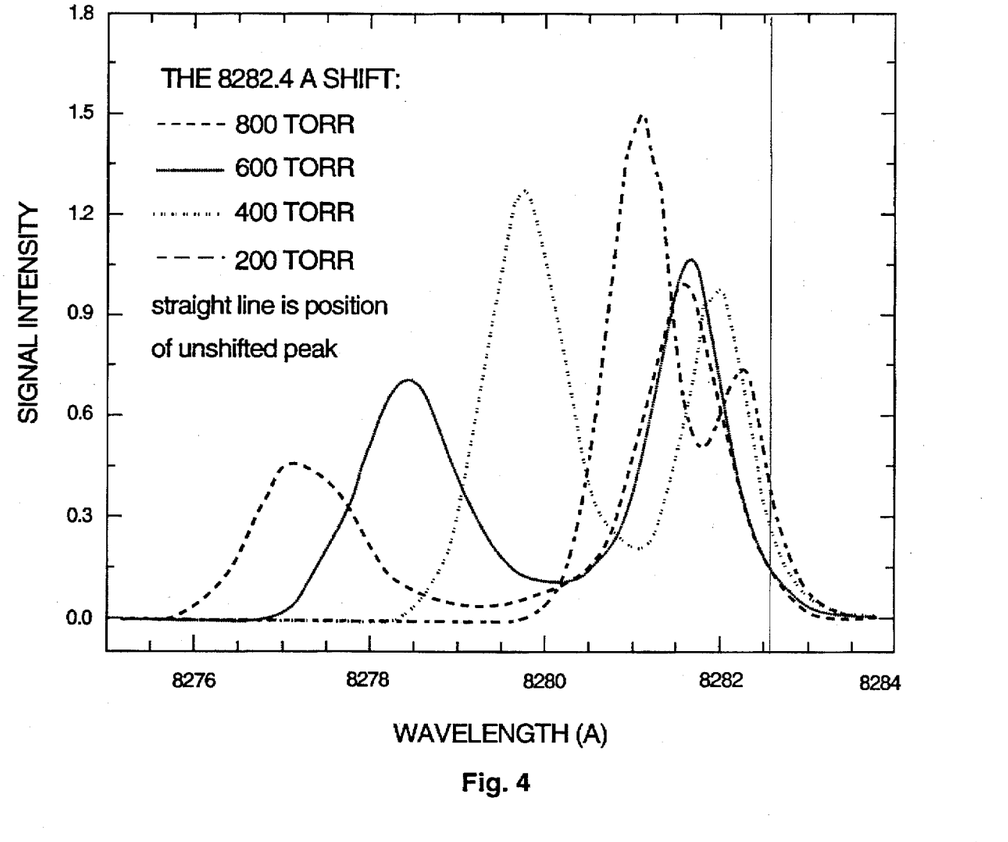
FIG. 4 (FIG. 4) is a graphical representation of backward directed optically pumped stimulated emission profiles for Xe, demonstrating the pressure dependent shift in wavelength for different analyte concentration. The data are for two-photon excitation of the $6P[1/2]_0$ state. OPSE is from the excited $6P[1/2]_0$ state down to the $6S[3/2]_1$ state. The peak intensity shifts to shorter wavelength as the Xe pressure is increased from 200 Torr to 800 Torr in this example. The curves packed tightly together near the characteristic wavelength represent time-delayed emission spectra not relevant to the present invention.

(ii) FIG. 4 shows a graphical representation of backward directed optically pumped stimulated emission profiles for Xe, demonstrating the pressure dependent shift in wavelength for different analyte concentration. The data are for two-photon excitation of the $6P[\frac{1}{2}]_0$ state. OPSE is from the excited $6P[\frac{1}{2}]_0$ state down to the $6S[\frac{3}{2}]_1$ state. The peak intensity shifts to shorter wavelength as the Xe pressure is increased from 200 Torr to 800 Torr in this example (the curves packed tightly together near the characteristic wavelength represent time-delayed emission spectra not relevant to the present inquiry). Hence, the present inventive apparatus could be efficiently used to, for example, monitor increasing emissions of a particular type of gas within an exhaust flume of a smokestack. Furthermore, this measurement would not be affected by the presence of other components within the exhaust flume.

Figure 5:
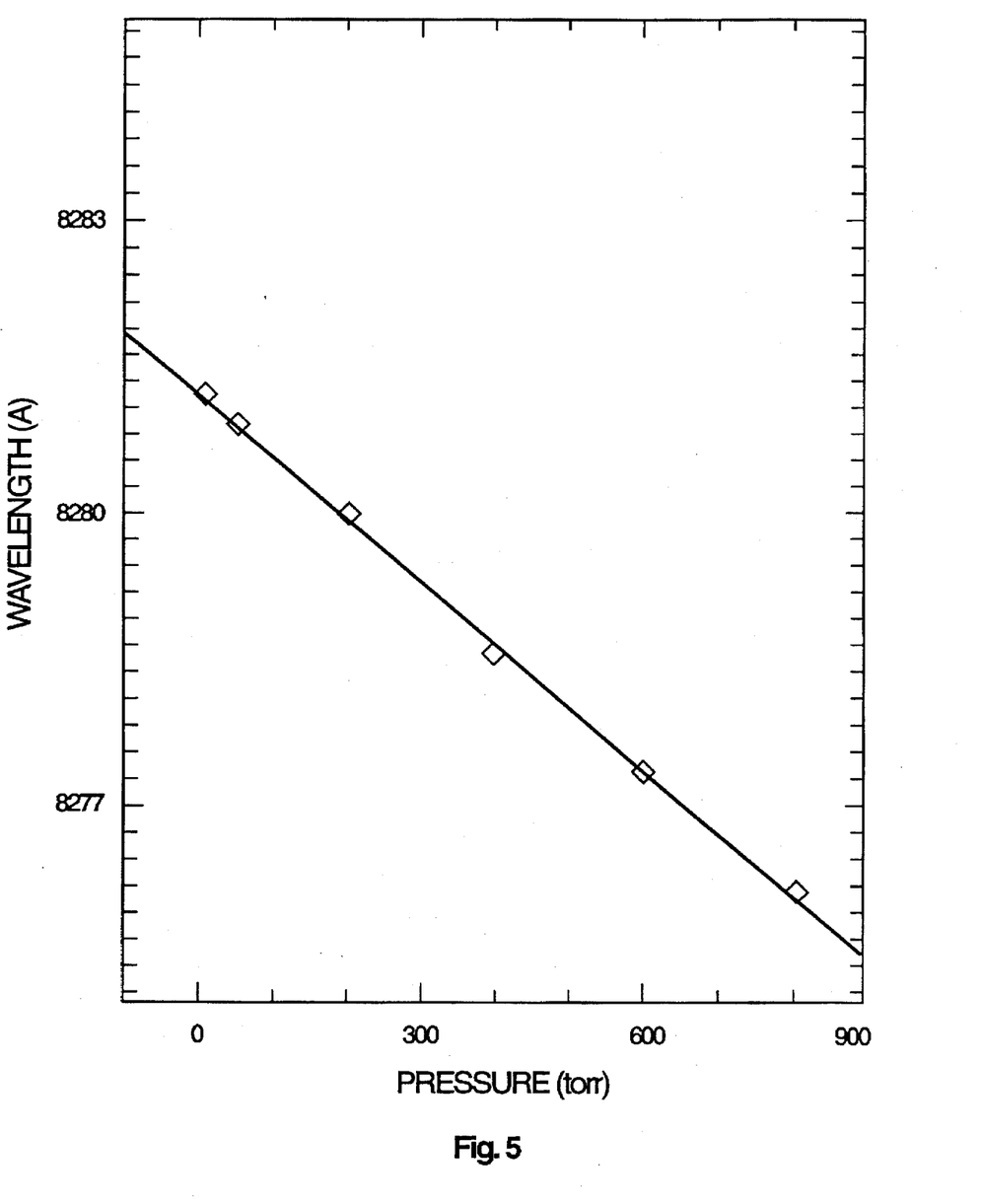
FIG. 5 (FIG. 5) is a plot of the pressure reading produced by the experimentally measured shift for the same Xe experiment as that shown in FIG. 4. The straight line is the reading from a pressure gauge. (This experiment is in pure Xe, so the partial pressure and total pressure are identical)
Figure 6:
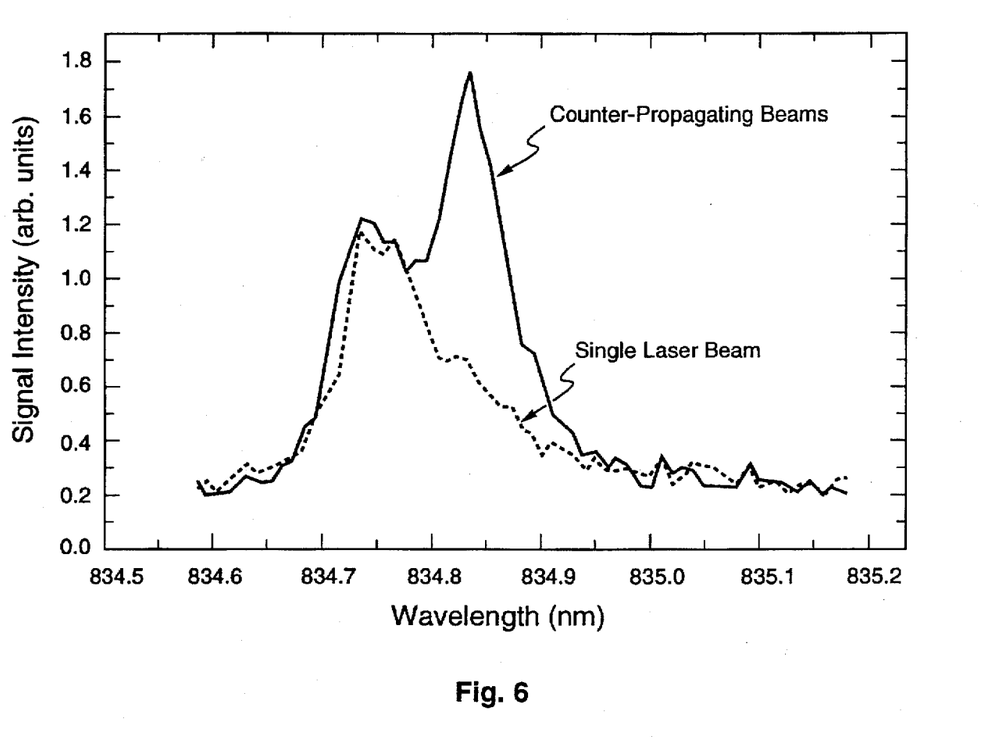
FIG. 6 (FIG. 6) is a plot of the backward OPSE from two-photon excitation of the $6P'[3/2]_2$ state in Xe. Here the lower trace is emission due to excitation by a single pump beam. The upper trace is OPSE produced by two counter-propagating beams, produced by retroreflecting the pump beam back through the sample. In this case, a large shift is produced in the first instance and a very small shift is produced by mixed beam pumping. The separation between the two peaks is proportioned to concentration (data taken at 400 Torr)

(iii) FIG. 5 also shows the usefulness of the present invention as a sensor mechanism. As can be seen, as the partial pressure of the component being measured (Xe gas) goes up, the shift in resonant wavelength also increases. For example, if a wavelength shift of 3.0 Angstroms is measured experimentally, it can be calculated that the partial pressure of Xenon is about 450 Torr. Note also, this would be the case regardless of the other components present within the sample. Conversely, if it were desired to fill a sample to a partial pressure at 800 Torr of Xe, it can easily be calculated that a wavelength shift of about 5.0Å will need to be present. Clearly, these curves will be different for different gases. The curves will also be different for different spectrometers. Each use of the inventive process and apparatus will need to calibrate his/her spectrometer, i.e., by generating curves analogous to FIG. 5 for different analytes. A great benefit of the present invention over the prior art, however, is that once calibrated a single time, these measurements of relative selective shift (i.e., extent of relative shift between shifted and unshifted spectral peaks at given analyte concentrations) will stay stable—that is, it will not necessary to continually recalibrate the user's spectrometer or to compare the measured reading against the characteristic wavelength (which would require very cumbersome and frequent calibration of the user's spectrometer to provide a reliable measurement of the analyte's characteristric frequency).

While there have been shown and described what are at present considered to be the preferred embodiments of the invention, it will be clear to those skilled in the art that various changes and modifications may be made thereto without departing from the scope of the invention, which is defined by the appended claims.

What is claimed is:

1. An apparatus for measuring the concentration of a gaseous component within a sample of a gaseous mixture, said gaseous component being characterizable by a resonance wavelength of highest emission intensity, said apparatus comprising:

(a) at least one tunable laser for providing coherent electromagnetic radiation to said sample, wherein said at least one tunable laser provides resonant excitation of said sample, which said sample then undergoes stimulated emission, the overall process involving an odd number of photons of electromagnetic radiation, said number of photons being greater than one;

(b) at least one resolving device for modifying the electromagnetic radiation produced by said at least one tunable laser such that after the electromagnetic radiation impinges said sample, the intensity of the stimulated electromagnetic radiation emitted by said sample at certain wavelengths will by modified, wherein measured along the forward path of said at least one tunable laser through said sample, the modification of the electromagnetic energy will comprise a shift in wavelengths of the highest intensity peaks and, wherein measured along the forward path of said at least one tunable laser through said sample, and only along the forward path, the modification of the electromagnetic energy will comprise a suppression of intensity at said resonance wavelength of highest emission intensity characteristic of said gaseous component; and (c) a detector system for measuring the modifications in wavelengths of said electromagnetic radiation.

2. The apparatus of claim 1, wherein said at least one resolving device includes at least one device selected from a group consisting of beamsplitters, mirrors and optical filters.

3. The apparatus of claim 2, wherein said detector system includes an optical spectrometer and a data recorder.

4. The apparatus of claim 3, wherein said source of electromagnetic radiation comprises two tunable lasers.

5. A method of measuring the concentration of a gaseous component within a sample of a gaseous mixture, comprising:

(a) radiating said sample with sufficient coherent electromagnetic energy to cause at least a portion of said gaseous component to undergo stimulated emission, that is to cause an optically pumped stimulated emission (OPSE) effect to occur within said sample, wherein said radiating step comprises radiating said sample with at least one tunable laser, said radiating step and stimulated emission step together involving a non-unitary odd number of photons of electromagnetic energy;

(b) resolving an emission spectra from said component into the OPSE and non-OPSE portions;

(c) measuring said OPSE portion of said emission spectra, wherein measuring forward along a direction parallel to said laser radiation of said at least one tunable laser, and only along said forward direction, the intensity of said stimulated emission spectra will be suppressed at the resonance wavelengths normally characteristic of said sample, and wherein measuring backwardly along a direction parallel to said laser radiation of said at least one tunable laser, the wavelength of the points of peak intensity of said stimulated emission spectra which are representative of said sample will be shifted.

6. The method of claim 5, wherein said resolving step comprises using at least one of the optical devices selected from the group comprising beamsplitters, mirrors and optical filter to resolve said emission spectra into spectra which may be measured in at least the direction parallel to the path of the laser radiation source as well as the direction anti-parallel to the path of the laser radiation source.

7. The method of claim 6, wherein said measuring step comprises employing an optical spectrometer to measure the intensity of said emission spectra at various wavelengths.

8. The method of claim 7, wherein the extent of said shift in wavelengths of peak emission spectra intensity for said sample is linearly dependent upon the partial pressure of said gaseous component within said sample of said gaseous mixture, but independent of the partial pressures of any other components within said gaseous mixture.

9. The method of claim 8, wherein said measurement of concentration can be completed in real time and on unconfined gaseous mixtures.

10. The method of claim 9, wherein said optically pumped stimulated emissions interact with said resonance wavelengths characteristic of said sample to cause said suppression and shifting of peak wavelength intensity in the forward and backward directions respectively along the path of said at least one tunable laser.

11. The method of claim 10, wherein said resolving step further comprises positioning a mirror optically downstream from said sample, whereby after said emission spectra have travelled forwardly from said sample, said forwardly travelling spectra will be reflected back through said sample, whereby said forwardly-travelling emission spectra will mix with backwardly-moving spectra which have been emitted by said sample after said forwardly-travelling spectra were emitted by said sample later and the resultant spectra caused by said mixing may be read by said optical spectrometer.

* * * * *